(No Model.)

J. A. PARK.
SNAP HOOK FOR HARNESS.

No. 342,877. Patented June 1, 1886.

WITNESSES
Phil C. Dieterich.
Geo. M. Finckel

INVENTOR
Jas. A. Park
By ........ Attorney

UNITED STATES PATENT OFFICE.

JAMES A. PARK, OF LANSING, MICHIGAN, ASSIGNOR TO P. E. PARK, OF SAME PLACE.

SNAP-HOOK FOR HARNESS.

SPECIFICATION forming part of Letters Patent No. 342,877, dated June 1, 1886.

Application filed June 30, 1884. Serial No. 136,379. (No model.)

*To all whom it may concern:*

Be it known that I, JAMES A. PARK, of Lansing, in the county of Ingham and State of Michigan, have invented certain new and useful Improvements in Snap-Hooks for Harness; and I do hereby declare the following to be a full, clear, and exact description of the invention, such as will enable others skilled in the art to which it pertains to make and use the same.

My invention relates to snap-hooks, the object being to provide a snap-hook adapted to permit the attachment of a strap without sewing or riveting.

The invention consists in a snap-hook having a shank formed at one end with a downwardly-inclined loop, and at the other end with a shoulder projecting over the hook so as to permit the attachment and retention of a strap upon said hook and under the shank.

Figure 1:
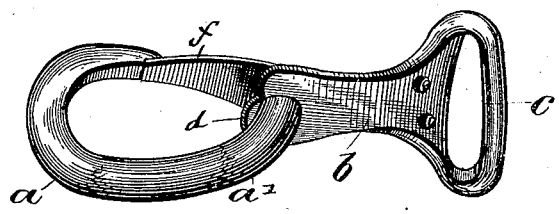
Figure 2:
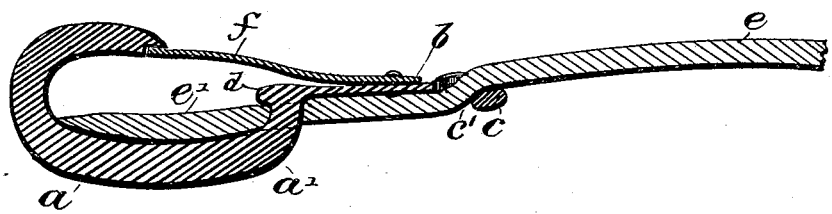
Figure 3:
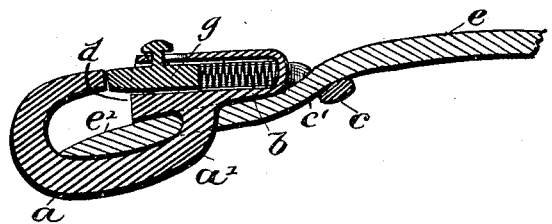

In the accompanying drawings, Figure 1 illustrates my improved snap-hook in perspective. Fig. 2 is a central longitudinal section of the same with a strap attached. Fig. 3 illustrates a longitudinal section of a modification.

$a$ indicates the hook of the device, and $b$ the shank thereof. The shank $b$ is widened to form a suitable bearing-surface for the strap, and it is formed at one end with a downwardly-inclined loop, $c$. The opposite end of the shank projects slightly over the hook $a$, forming a shoulder or extension, $d$, to retain the strap securely after the latter has been applied.

$f$ represents a flat spring, secured in the usual manner to the upper side of the shank $b$.

The strap $e$ is formed with an opening or slot (preferably elongated so as not to materially weaken it) through which the hook $a$ passes to permit the strap to rest upon the upper side of the hook below the shoulder $d$.

In applying the strap it is first passed through the inclined loop $c$ and then hooked over the hook $a$, as clearly seen in Figs. 2 and 3. The bend or kink $c'$ serves to maintain the strap in position. I prefer to form the hook $a$ larger than the usual hook in ordinary snaps, so that the free working of the spring will not be interfered with. However, the projecting extension $d$ of the shank, in connection with the bend in the strap, will prevent the rising up of the end $e^2$ of the strap.

As seen in Fig. 3, I may use a spiral-spring-pressed keeper, $g$, in lieu of the flat spring $f$, and I therefore do not limit myself to any particular form of spring.

It will be clear from the above description and accompanying drawings that I provide means for securely connecting a snap-hook and strap without the aid of stitching or rivets.

I claim as my invention—

A snap-hook having a shank formed at one end with a downwardly-inclined loop, and at the other end with a shoulder or extension projecting over the hook so as to permit the attachment and retention of a strap upon said hook and under the shank, substantially as set forth.

In testimony whereof I have signed this specification in the presence of two subscribing witnesses.

JAMES A. PARK.

Witnesses:
GEO. W. FREEMAN,
DEAN PARK.